United States Patent [19]
Hoffend et al.

[11] 4,330,460
[45] May 18, 1982

[54] PROCESS FOR PREPARING COLORED TONER PARTICLES EMPLOYING A HALOGEN SALT TO INHIBIT THE AQUEOUS PHASE POLYMERIZATION

[75] Inventors: Thomas R. Hoffend, Webster; Robert A. Nelson, Fairport, both of N.Y.

[73] Assignee: Xerox Corporation, Stamford, Conn.

[21] Appl. No.: 139,925

[22] Filed: Apr. 14, 1980

[51] Int. Cl.³ .................. C08F 2/20; C08J 3/20; G03G 9/08
[52] U.S. Cl. .................. 524/849; 524/524; 430/109; 430/137; 526/237; 523/205
[58] Field of Search .......... 260/42.21, 42.43, 42.53, 260/42.57, 42.46, 42.47, 42.49

[56] References Cited

U.S. PATENT DOCUMENTS

| | | | |
|---|---|---|---|
| 3,179,648 | 4/1965 | Casale et al. | 260/42.53 |
| 3,183,208 | 5/1965 | Jurgeleit | 260/42.53 |
| 3,634,251 | 1/1972 | Maeda et al. | 260/42.53 |
| 4,071,670 | 1/1978 | Vanzo et al. | 526/88 |
| 4,077,804 | 3/1978 | Vanzo | 260/42.53 |
| 4,231,919 | 11/1980 | Isaacson | 260/42.53 |
| 4,264,700 | 4/1981 | Bayley | 260/42.53 |
| 4,269,760 | 5/1981 | Wakimoto et al. | 260/42.53 |
| 4,282,304 | 8/1981 | Bayley | 260/42.53 |

OTHER PUBLICATIONS

Derwent Abst. 02704, (11-19-77), J52138933, Ricoh KK.

*Primary Examiner*—Herbert J. Lilling
*Attorney, Agent, or Firm*—E. O. Palazzo

[57] ABSTRACT

Dispersion polymerization process for producing colored toner particles comprising admixing a colorant with a monomer to form an oil soluble organic phase, admixing a polymerization initiator with the organic phase, admixing the organic phase with an aqueous phase containing a suspending agent and an inorganic salt therein under polymerization conditions to form a suspension, polymerizing the suspension under continuous agitation to provide polymer particles containing the colorant and having a particle size in the range of from about 1 micron to about 100 microns, and recovering the polymer particles. The inorganic salt inhibits polymerization in the aqueous phase. Developer compositions and processes for developing electrostatic latent images are also disclosed.

4 Claims, No Drawings

PROCESS FOR PREPARING COLORED TONER PARTICLES EMPLOYING A HALOGEN SALT TO INHIBIT THE AQUEOUS PHASE POLYMERIZATION

This invention relates in general to electrostatography, and more particularly, to a polymerization process for the preparation of developer materials.

Electrostatography is perhaps best exemplified by the basic process of xerography as first described in U.S. Pat. No. 2,297,691 to C. F. Carlson. This process involves placing a uniform electrostatic charge on a photoconductive insulating layer, exposing the layer to a light-and-shadow image to dissipate the charge on the areas of the layer exposed to the light and developing the resulting electrostatic latent image by depositing on the image a finely divided electroscopic material referred to in the art as "toner". The toner will normally be attracted to those areas of the layer which retain a charge, thereby forming a toner image corresponding to the electrostatic latent image. This powder image may then be transferred to a support surface such as paper. The transferred image may subsequently be permanently affixed to the support surface as by heat. Instead of latent image formation by uniformly charging the photoconductive layer and then exposing the layer to a light-and-shadow image, one may form the latent image by directly charging the layer in image configuration. The powder image may be fixed to the photoconductive layer if elimination of the powder image transfer step is desired. Other suitable fixing means such as solvent or overcoating treatment may be substituted for the foregoing heat fixing steps.

Several methods are known for applying the electroscopic particles to the electrostatic latent image to be developed. One development method, as disclosed by E. N. Wise in U.S. Pat. No. 2,618,552, is known as "cascade" development. In this method, a developer material comprising relatively large carrier particles having finely-divided toner particles electrostatically coated thereon is conveyed to and rolled or cascaded across the electrostatic latent image bearing surface. The composition of the carrier particles is so selected as to triboelectrically charge the toner particles to the desired polarity. As the mixture cascades or rolls across the image bearing surface, the toner particles are electrostatically deposited and secured to the charged portion of the latent image and are not deposited on the uncharged or background portions of the image. Most of the toner particles accidentally deposited in the background are removed by the rolling carrier, due apparently, to the greater electrostatic attraction between the toner and the carrier than between the toner and the discharged background. The carrier and excess toner are then recycled. This technique is extremely good for the development of line copy images.

Another method of developing electrostatic latent images is the "magnetic brush" process as disclosed, for example, in U.S. Pat. No. 2,874,063. In this method, a developer material containing toner and magnetic carrier particles are carried by a magnet. The magnetic field of the magnet causes alignment of the magnetic carrier into a brush-like configuration. This "magnetic brush" is engaged with the electrostatic image-bearing surface and the toner particles are drawn from the brush to the latent image by electrostatic attraction.

Most other electrostatographic techniques use the above described or similar development methods employing the same type of marking material or toner, and differ only in the mode of forming the electrostatic latent image charge pattern which is developed. (See, for example, U.S. Pat. No. 2,576,047 to Schaffert and U.S. Pat. No. 3,064,259 to Schwertz). In another technique, for example, in U.S. Pat. No. 3,081,698 to Childress, a conductive screen with a plurality of apertures which define the image area to be reproduced is spaced opposite a conductive backing electrode and a potential is applied between this backing electrode and the screen such that when finely divided electrostatographic toner particles smaller than the apertures in the screen are applied to the surface of the screen opposite the backing electrode, the electrostatic field set up by the potential source causes the particles to move through the apertures in the screen to form a toner image on the backing electrode in the configuration of the apertures on the screen. Various surfaces may be interposed between the screen and the backing electrode so that the particle image may be intercepted and formed on such interposed surfaces. Regardless of the surface upon which the toner image is deposited, it may be fixed in place upon that surface or transferred to another surface and fixed thereon.

The common feature of all of these electrostatographic systems is that they employ the lines of force from an electric field to control the deposition of finely divided, marking material or toner on a surface, thus forming an image with the toner particles.

In addition to the developing powder or toner materials described in the original Carlson patent, a number of other toner materials have been developed which are especially valuable for use in the newer development techniques including the cascade technique described immediately above. Generally speaking, these new toner materials have comprised various improved resins mixed with different pigments such as carbon black. Some exemplary patents along this line include U.S. Pat. No. 2,649,670 to Copley which describes a toner resin of rosin-modified phenol-formaldehyde, U.S. Reissue Pat. No. 25,136 to Carlson which describes a xerographic toner employing a resin of styrene polymers and copolymers and U.S. Pat. No. 3,079,342 to Insalaco describing a plasticized styrene-methacrylate copolymer resin.

PRIOR ART

In the past, these toners have generally been prepared by thoroughly mixing the softened resin and pigment to form a uniform dispersion as by blending these ingredients in a rubber mill or the like and then pulverizing this material to form it into small particles. Most frequently, this division of the resin-pigment dispersion has been made by jet pulverization of the material. Although this technique of toner manufacture has produced some very excellent toners, it does tend to have certain shortcomings. For example, it generally produces a rather wide range of particles sizes in the toner particles. Although the average particle size of toner made according to this technique generally ranges between about 2 and about 30 microns, individual particles ranging from submicron in size to above 30 microns are not infrequently produced. Furthermore, this is a batch process which tends to be slow, expensive, noisy and dusty. In addition, this technique of toner production imposes certain limitations upon the material selected for the toner because the resin-pigment dispersion must be sufficiently friable so that it can be pulverized at an economically feasible rate of production. The problem which arises from this requirement is that when the resin-pigment dispersion is sufficiently friable for really high speed pulverizing, it tends to form an even wider range of particle sizes during pulverization including relatively large percentages of fines. In addition, such highly friable materials are frequently subject to further pulverization or powdering when they are employed for developing in an electrostatographic copying apparatus. All other requirements of electrostatographic developers or toners including the requirements that they be stable in storage, non-agglomerative, have the proper triboelectric properties for developing, form good images, do not film or soil the photoconductive plate and have a low melting point for heat fusing are only compounded by the additional requirements imposed by this toner forming process.

Consequently, other toner material preparation processes have been developed such as that disclosed in U.S. Pat. No. 4,077,804 to E. Vanzo. In this process, toner particles are provided per in-situ polymerization by mixing a monomer, a colorant and an initiator to form an oil soluble organic phase which is dispersed in controlled size in a water phase with a suspending agent and polymerized employing conventional suspension polymerization techniques. A second monomer is introduced to the system and allowed to diffuse into and swell the first polymer. A water soluble initiator is introduced and the reaction mixture is heated to effect polymerization of the second monomer and form the desired toner material.

Another toner material preparation process is disclosed by E. Vanzo and L. Smith in U.S. Pat. No. 4,071,670. It is therein taught a method of forming particles of between about 5 and 50 microns utilizing a two-stage suspension polymerization process wherein monomer and a colorant is sized to a narrow range by high shear mixing then polymerized during slow speed agitation.

However, in dispersion polymerization toner preparation processes, competing polymerization which occurs in the aqueous phase causes toner yield to be decreased by the formation of undersized, unpigmented polymer particles which must be removed from the toner since they produce unsatisfactory results when employed to develop electrostatic latent images.

Accordingly, it is an object of this invention to provide a toner preparation process which overcomes the above-noted disadvantages.

It is a further object of this invention to provide electrostatographic developer materials having improved composition and uniformity and triboelectric charging characteristics.

It is another object of this invention to provide a dispersion polymerization toner preparation process which inhibits the formation of undersized, unpigmented polymer particles in the aqueous phase thereof.

It is another object of this invention to provide electrostatographic toner and developer materials having physical and electrostatographic properties superior to those of known toner and developer materials.

These and other objects of the instant invention are accomplished, generally speaking, by providing a process for producing colored toner particles comprising mixing a monomer, a colorant, and an initiator to form an oil soluble organic phase; dispersing this oil soluble phase in a controlled size range of between about 5 to about 20 microns in an aqueous phase; adding a suspending and/or dispersing agent to the aqueous phase and an inorganic salt which scavenges or deactivates species which promote polymerization of the monomer in the aqueous phase, and heating the mixture to effect polymerization of the polymer and form colored toner particles. It has been found that aqueous phase polymerization normally occurring during free radical dispersion polymerization of colored toner particles can be prevented by the addition to the aqueous phase of the reaction mixture various inorganic salts which trap, scavenge or otherwise deactivate the species in the reaction mixture which cause polymerization in the aqueous phase. The inorganic salts added to the aqueous phase to prevent polymerization therein however must be selected as to be of a nature and concentration that monomer polymerization in the oil soluble organic phase is permitted to occur.

In accordance with this invention, preferably prior to polymerization of the oil soluble organic phase, a small amount of an inorganic salt derived from an alkali or alkaline earth metal and a halogen, or an inorganic salt derived from a transition metal and a halogen is added to the aqueous phase of the dispersion polymerization mixture to scavenge or deactivate the active species therein which promote polymerization of the monomer in the aqueous phase. The aforementioned salt may also be added to the aqueous phase of the reaction mixture at the beginning of the polymerization process, or slowly such as in increments in a programmed or post-addition fashion throughout the term of the polymerization reaction. This latter salt addition method has the advantage of continually maintaining a small, but effective amount of the salt in the aqueous phase throughout the polymerization reaction. It has been found that the addition of such inorganic salts prevents polymerization in the aqueous phase of the reaction mixture without affecting the conversion of the pigmented monomer droplets to toner particles.

In accordance with this invention, the inorganic salts which are suitable for the prevention of polymerization in the aqueous phase of a monomer reaction mixture may be selected from the group consisting of inorganic salts derived from an alkali and/or alkaline earth metal and a halogen. The alkali and/or alkaline earth metal may be selected from sodium, potassium, cadmium, magnesium, calcium, barium and zinc when appropriately soluble in water. The halogen may be selected from fluorine, chlorine, bromine or iodine, with iodine being the preferred halogen. Further, the inorganic salt may be derived from a transition metal such as iron, nickel, chromium, titanium or manganese and a halogen. In addition, these inorganic salts may be employed individually or in mixtures.

Very low concentrations of the inorganic salts are sufficient for the control and/or elimination of the unwanted aqueous phase polymerization. That is, the amount of inorganic salt to be employed can be less than 2000 parts per million based on the weight of the water phase, and preferably, between about 25 and about 400 parts per million.

Although not wishing to be bound by any theory, it is believed that the function of the aforementioned inorganic salts is to behave as a trap, scavenger or inactivator for the active species causing polymerization in the aqueous phase of the reaction mixture. It is believed most likely that the active specie or chemical constituent causing the aqueous phase polymerization is a free radical produced from the polymerization reaction initiator or catalyst. It is also believed that the inorganic salts added to the reaction mixture destroy, inhibit or prevent the aqueous phase polymerization initiating site. Both the cation and anion of these inorganic salts apparently react with the aqueous phase polymerization initiating species and/or alkyl radicals which are formed and efficiently inhibit the undesired aqueous phase polymerization.

In the polymerization process, any suitable organic monomer can be employed in the present invention. The selection of a particular monomer should be dictated by the properties desired in the ultimate polymeric toner and the requirements of dispersion polymerization of any oil phase monomer system in an aqueous continuous phase. Thus, for example, monomers having the characteristic vinyl $C=C$ structure are preferably employed. Illustrative of such monomers are esters of saturated alcohols with mono and polybasic unsaturated acids such as alkyl acrylates and methacrylates, haloacrylates, diethyl maleate, and mixtures thereof; vinyl and vinylidene halides such as vinyl chloride, vinylidene chloride, and mixtures thereof; vinyl esters such as vinyl acetate, unsaturated aromatic compounds such as styrene and various alkyl styrenes, alpha-methyl styrene parachlorostyrene, parabromostyrene, 2,4-dichlorostyrene, vinyl naphthalene, paramethoxystyrene and mixtures thereof; unsaturated amides; unsaturated nitriles such as methacrylonitrile, haloacrylonitrile, phenylacrylonitrile, vinylidene cyanide, and mixtures thereof; N-substituted unsaturated amides; conjugated dienes such as butadiene, isoprene and mixtures thereof; unsaturated ethers; unsaturated ketones; unsaturated aldehydes and acetals; unsaturated heterocyclic compounds such as vinyl pyridine, N-vinyl carbazole, and mixtures thereof; unsaturated alicyclic compounds such as vinylcyclopentane, vinyl-cyclohexane and mixtures thereof; unsaturated thio compounds such as vinyl thioethers; unsaturated hydrocarbons such as polymerizable hydrocarbon fractions, isobutylene and mixtures thereof; allyl compounds such as allyl alcohol, allyl esters, diallyl phthalate, triallylcyanurate and mixtures thereof. In addition, any suitable mixture of copolymerizable monomers of the type described above can also be used in the process of this invention.

Any suitable water-insoluble colorant, whether oil soluble or oil insoluble, pigment or dye can be dispersed or dissolved in the organic monomer or mixtures of monomers to form the organic phase employed in the dispersion polymerization process of this invention. If desired, especially for photoelectrophoretic processes, photosensitive colorants can also be employed. Additionally, combinations of pigments and/or dyes can be employed to obtain specific coloration effects.

The colorant can be dispersed in the monomer by admixing the colorant with the monomer under intensive agitation as obtained, for example, in a high speed, high shear mixer such as a Waring Blender equipped with a Polytron high shear head, a homogenizing mixer or the like, capable of a speed of from about 1000 to 3000 rpm. The amount of colorant added can range from about 2 to about 15 weight percent based on the weight of the monomer. Preferably, prior to dispersion of the colorant in the monomer, dispersing aids can be added to the monomer such as surfactants, dispersants and the like to assist in effecting a uniform dispersion. It has been found that increasing the viscosity of the monomer prior to addition of the colorant is an effective means of stabilizing the colorant dispersion. Suitable oil soluble surfactants can be employed to aid the dispersion of colorant. Generally, from about 0.25 to about 3 weight percent surfactant based on the weight of monomer is sufficient. Stabilization of the colorant dispersion can be obtained by increasing the viscosity of the monomer-colorant dispersion through addition of a polymer soluble in the monomer. Generally, the most conveniently employed polymer is the polymer corresponding to the monomer employed; however, other suitable polymers which are soluble in the monomer can also be employed. Stabilization can be effected by addition of from about 1 to about 20 weight percent polymer based on the weight of the monomer. A uniform dispersion of the colorant in the monomer can be effected by continuous high speed mixing for from about 10–20 minutes although longer or shorter periods can be employed depending upon the particular mixer employed.

Once the colorant/monomer dispersion is obtained, a polymerization initiator can be admixed therewith just prior to commencement of polymerization. Most conveniently, the polymerization initiator can be dissolved in a portion of monomer and the resulting solution can be blended with the colorant/monomer dispersion. Illustrative polymerization initiators which can be suitably employed are azobisisobutyronitrile (AIBN), benzoyl peroxide, lauroyl peroxide, 2,4-dichloro benzoyl peroxide and the like. Generally, from about 0.5 to about 10.0 weight percent initiator based on the weight of monomer is sufficient.

In addition to the preparation of a readily polymerizable organic phase, the dispersion polymerization process of the present invention requires an aqueous phase containing a suspending agent. The aqueous phase can be prepared by dissolving a suspending agent in water with continuous agitation. Suitable water soluble suspending agents are, for example, water soluble polymers such as polyvinyl alcohol, polyethylene oxide, methyl cellulose, hydroxyethyl cellulose, cyanoethyl cellulose and the like. Generally, from about 0.5 to about 10 weight percent suspending agent based on the weight of water has been found sufficient to effect a dispersion of the organic phase when said phase is admixed with the aqueous phase. Above about 10 weight percent, the resulting viscosity of the aqueous phase would generally be too high to enable the obtainment of the desired particle size. Preferably, 0.5 to about 4 weight percent suspending agent is employed.

After preparation of the aqueous phase, the aqueous phase can be charged to a reaction vessel and stirred at high speeds of from about 1000 to about 8000 rpm, while the organic phase is added thereto. Under these conditions, the organic phase is rapidly and uniformly dispersed within the aqueous phase as a plurality of particles having an average particle size ranging from 1 to about 100 microns. Generally, sufficient organic phase is added to the aqueous phase to effect a volumetric ratio of organic phase to aqueous phase ranging from about 0.05:1 to about 0.4:1, and preferably ranging from about 0.1:1 to about 0.2:1.

Upon completion of the addition and dispersion of the organic phase in the aqueous phase, the speed of agitation can be reduced to about 80 to 300 rpm. Polymerization can be rapidly effected at a polymerization temperature of about 30° to about 95° C. Under these polymerization conditions, the reaction will be complete within from about 1 to 7 hours. Higher or lower temperatures can be employed depending upon the particular polymerization initiator employed.

When using untreated carbon black as the colorant, initiation of polymerization sometimes becomes complicated because of the ability of the carbon black to trap the free radicals generated. AIBN, however, has been found to be an effective initiator even with carbon black.

Upon completion of the polymerization, the polymerized particles can be recovered by cooling the reaction vessel to room temperature while stirring continuously to prevent agglomeration. Thereafter, the reaction medium can be thoroughly washed with water to remove the suspending agent and the particles can be recovered by filtration and drying.

The toner compositions obtained in accordance with the present invention can be admixed with solid carriers or non-solvent liquid vehicles therefor to form electrostatographic developer compositions. In general, successful results have been obtained with from about 10 to about 200 parts by weight of either solid or liquid vehicle to about 1 part by weight of toner. Preferably, the vehicle to toner ratio ranges from about 50 to 1 to about 150 to 1. In such preferred compositions the vehicle acts effectively to remove any toner particles which might tend to adhere to a non-image area and the toner itself forms dense readily transferable and fusible images.

Solid vehicles are generally in the form of granular carrier particles which are grossly larger than the toner particles by at least an order of magnitude of size and are shaped to roll across the image-bearing surface.

Generally speaking, the carrier particles should be of sufficient size so that their gravitation or momentum force is greater than the force of attraction of the toner in the charged areas where the toner is retained on the photoconductive plate in order that the granular carrier particles will not be retained by the toner particles, while, at the same time, the toner particles are attracted and held, or repelled, as the case may be, by the charged or uncharged area of the plate since said toner particles acquire a charge of opposite polarity to the charge of both the granular carrier particles and the plate. It has been found best to use granular carrier particles of a size larger than about 20 microns, usually between 30 and about 1,000 microns, and toner particles of a size from about 5 to 20 microns. The granular carrier particles may, if desired, be somewhat larger or smaller as long as the proper size relationship to the electroscopic toner is maintained so that the granular carrier particles will flow easily over the image surface by gravity when the plate is inclined without requiring additional means or measures to remove them.

Typical carrier materials include: sodium chloride, ammonium chloride, potassium chlorate, granular zircon, granular silicon, methyl methacrylate, glass, silicon dioxide, flintshot, iron, steel, ferrite, nickel, magnetite, carborundum, and mixtures thereof. Many of the foregoing and other typical carriers are described by L. E. Walkup et al, in U.S. Pat. No. 2,638,416 and E. N. Wise in U.S. Pat. No. 2,618,552.

When it is desired to employ a liquid developer composition, the toner compositions of the present invention can be incorporated in any conventional liquid vehicle which is a non-solvent for and non-reactive with the polymer and which has a volume resistivity above about $10^{10}$ ohm-cm and a dielectric constant greater than 2.5. In addition, the liquid vehicle should, if possible, be one which does not have an appreciable toxicity and which is not flammable. It is also considered desirable to employ a liquid which is neither malodorous nor highly colored. It is preferred that the liquid vehicle be inert to the material which bears the electrostatic latent image to be developed. Suitable liquid carriers are, for example, kerosene, turpentine, cyclohexane, silicones, fluorinated hydrocarbons such as tetrachlorodifluoroethane, trichlorotrifluoroethane and the like. Other suitable liquid vehicles are described in U.S. Pat. No. 2,899,335.

In another aspect of the present invention, an electrostatographic process is provided which employs the developer compositions of this invention. The toner develops the electrostatic latent image on the image bearing surface and can be fused thereon or can be subsequently electrostatically transferred to a substrate and then fused on the substrate to form a permanent image thereon.

The toner materials prepared by the process of this invention may be employed to develop an electrostatic latent image on any suitable photosensitive material. Typical photosensitive organic materials include substituted and unsubstituted organic pigments such as phthalocyanines, for example, copper phthalocyanine, beta form of metal-free-phthalocyanine; tetrachlorophthalocyanine; and x-form of metal-free phthalocyanine, quinacridones, as, for example, 2,9-dimethyl quinacridone; 4,11-dimethyl quinacridone; 3,10-dichloro-6,13-dihydroquinacridone; 2,9-dimethoxy-6,13-dihydroquinacridone and 2,4,9,11-tetrachloroquinacridone; anthraquinones such as 1,5-bis-(beta-phenylethylamino)anthraquinone; 1,5-bis(3'-methoxypropylamino) anthraquinone; 1,2,5,6-di(C,C'-diphenyl)-thiazole anthraquinone; 4-(2'-hydroxyphenyl-methoxyamino)anthraquinone; triazines such as 2,4-diaminotriazine; 2,4-di-(1'-anthraquinonylamino-6-(1'''-pyrenyl)-triazone; 2,4,6-tri-(1'-1'',1'''-pyrenyl)-triazone; azo compounds such as 2,4,6-tris(N-ethyl-p-aminophenylazo) phloroglucinol; 1,3,5,7-tetrahydroxyb 2,4,6,8-tetra (N-methyl-N-hyroxyl-ethyl-p-amino-phenylazo0 naphthalene; 1,3,5-trihydroxy-2,4,6-tri(3'-nitro-N-methyl-N-hydroxy-methyl-4'-aminophenylazo) benzene; metal salts and lakes of azo dyes such as calcium lake of 6-bromo-1(1'-sulfo-2-naphthaylazo)-2-naphthol; calcium lake of 1-(2'azonaphthalene-1'-sulfonic acid)-2-naphthol; calcium lake of 1-(4'-ethyl-5'-chloroazobenzene-2'-sulfonic acid)-2-hydroxy-3 naphthoic acid; and mixtures thereof. Other organic pigments include polyvinylcarbazole; trisodium salt of 2-carboxy phenyl axo (2-naphthiol-3,6-disulfonic acid; N-isopropyl-carbazole; 3-benzylidene amino-carbazole; 3-aminocarbazole; 1-(4'methyl 5'chloro-2'-sulfonic acid) azobenzene-2-hydroxy-3-napthoic acid; N-2''pyridyl-8,13-dioxodinaphtho-(2,1-b;2',3'-d)-furan-6 carboxamide; 2-amino-5-chloro-p-toluene sulfonic acid and the like. The x-form of metal free phthalocyanine is preferred because of its excellent photosensitivity and intense coloration.

Typical inorganic photosensitive compositions include cadmium sulfide, cadmium selenide, cadmium sulfo-selenide, zinc oxide, zinc sulfide, sulfur, selenium, antimony sulfide, lead oxide, lead sulfide, arsenic sulfide, arsenic-selenium, and mixtures thereof.

The following examples further define, describe and compare methods of preparing the toner compositions of the present invention and of utilizing them in developer compositions to develop electrostatic latent images. Parts and percentages are by weight unless otherwise indicated.

EXAMPLE I

A toner composition was prepared by dispersion polymerization as follows. An aqueous phase was prepared by dissolving about 5 parts of polyvinyl alcohol (Monsanto 20-60, St. Louis, Missouri) at about 50° C. using about 95 parts of distilled water and a magnetic stirrer equipped hot plate. The polyvinyl alcohol was added slowly by increments to the heated, vigorously stirred water until completely dissolved. A 0.5% solution of the polyvinyl alcohol was prepared by diluting about 50 cc. of the 5% solution with about 450 cc. of distilled water.

The organic phase was prepared as follows. A 32 ounce wide-mouth polyethylene bottle was rinsed twice with acetone and dried. About 58 parts of styrene, 42 parts of n-butyl methacrylate, and 8 parts of lauroyl peroxide were weighed into the bottle and hand-shaken for about ten minutes to dissolve the initiator. About 7 parts of carbon black was added to the monomer-initiator mixture which was placed overnight in a mechanical shaker at a low setting.

The 500 cc. of 0.5% polyvinyl alcohol was poured into a quart size stainless steel blender jar fitted with a Polytron ® rotor-stator Waring ® blender attachment available from VWR Scientific Company, P.O. Box 1050, Rochester, New York. The organic phase was removed from the mechanical shaker and added to the blender jar. The mixture was sheared and emulsified at a blender shaft speed of about 7,600 r.p.m. for about 60 seconds.

The contents of the blender jar was poured into a one liter three-neck round bottom blask fitted with a Heller ® stirring motor and controller with a Teflon ® paddle blade stirred for polymerization of the monomer dispersion. Two of the flask necks were closed with glass stoppers. The flask was placed in a water bath preheated to about 70° C. and the contents stirred at about 100 to 120 RPM. After about 1 hour, the stirring rate was increased to about 150 RPM for about 15 seconds while about 75 cc. of 5% polyvinyl alcohol solution was added giving a total of about 1.1% polyvinyl alcohol by weight based on water content to the mixture. The additional polyvinyl alcohol prevents coalescence and/or agglomeration of the organic dispersion as the organic phase polymerizes through a tacky state. After two hours of reaction time, the polymerization temperature was increased to about 75° C. over a period of about 45 minutes. The temperature increase provides increased radical concentration to obtain complete conversion. Polymerization was continued at about 75° C. for about an additional 4θ hours. The polyvinyl particles are then allowed to settle, centrifuged, filtered and dried. The resultant supernatant is extremely cloudy, turbid and milky white indicative of large amounts of aqueous phase polymer.

EXAMPLE II

A control toner composition was prepared by dispersion polymerization as follows. An aqueous phase was prepared by dissolving about 0.5 parts of polyvinyl alcohol (Monsanto 20-60, St. Louis, Missouri) in about 500 parts of distilled water at about 75° C. using a magnetic stirrer equipped hot plate. About 0.2 parts of carbon black commercially available as Raven 420 from the Columbian Division of Cities Service Company, Akron, Ohio, was dispersed in the aqueous phase with agitation.

The organic phase was prepared by dissolving about 81.7 parts of styrene and about 4.3 parts of n-butyl methacrylate in a 32 ounce wide-mouth polyethylene bottle. To the contents thereof was added about 14 parts of grafted carbon black. The grafted carbon black consisted of about 7 parts of Raven 420 carbon black and about 7 parts of polymer comprising about 95 parts of styrene and about 5 parts of n-butyl methacrylate. The grafted carbon black was prepared in a plastograph-type kneader-mixer ("flusher"). The "flusher" was first filled with water and pre-heated to about 180° F. with steam-water flowing through the jacket of the "flusher". When the water in the "flusher" reached about 180° F., the water was dumped from the "flusher" and about 807.5 g. styrene monomer, about 42.5 g. of n-butyl methacrylate monomer and the appropriate weight of AIBN were added to the "flusher". The styrene monomer was earlier freed of TBC inhibitor by elution through a neutral aluminum oxide column. The n-butyl methacrylate monomer, low inhibitor grade, was used as received. With slow motion of the "flusher" mixing blades (about 3 r.p.m.), the initiator quickly dissolved in the hot monomers (about 140°-150° F.). As soon as the initiator dissolved (visually), addition of the Raven 420 carbon black was begun. The carbon black was added to the monomer-AIBN mixture as quickly as possible, i.e., as fast as the liquid phase would accept the carbon black and still allow the mixture to mix. The carbon black addition was completed over about 45 minutes. At the end of carbon black addition, the mixture temperature had risen to about 155°-160° F. and the mixture had become fairly fluid. At this point, the "flusher" was covered with a flat plate and clamped shut. Mixing and heating continued, with an effort made to control the mixture temperature between 158° and 170° F. (70°-77° C.). Using manual control of the steam-water flow through the flusher jacket, this temperature was maintained for about 2 hours (±about 0.5 hrs.), whereupon the reactor temperature increased uncontrollably to about 190°-200° F. At this temperature, full cooling water was put through the "flusher" jacket, and the carbon black-polymer mixture ("grafted" carbon black) was removed from the "flusher" before it solidified. The "grafted" carbon black was then cooled, crushed (via Fitz mill) and heated at about 79° C. in a vented oven for 12-14 hours to assure decomposition of any residual AIBN.

To the organic phase mixture of styrene, n-butyl methacrylate, and grafted carbon black was added about 6.9 parts of lauroyl peroxide with mixing to dissolve the peroxide.

The organic phase was added to the aqueous phase and the mixture was sheared at a speed of about 7600 r.p.m. to disperse and suspend the droplets until their volume median size was about 10 microns. The dispersed suspension was then transferred to a one liter three-neck round bottom flask fitted with a Heller ® stirring motor and controller with a Teflon ® paddle blade stirrer for polymerization of the monomer dispersion. Two of the flask necks were closed with glass stoppers. The flask was placed in a water bath preheated to about 75° C. and the contents stirred at between about 100 to 200 r.p.m. for about 6 hours. The reaction mixture was then poured into about 3 liters of distilled water and stirred for about 2 hours. The polymerized particles where then allowed to settle, centrifuged, filtered, washed with water, and dried under vacuum at about 35° C.

The amount of polymerized particles recovered was found to be between 70 and 75% by weight of the starting materials.

EXAMPLES III-VI

A toner composition was prepared as in Example II except that about 0.025 parts (50 ppm), 0.05 parts (100 ppm), 0.10 parts (200 ppm), and 0.15 parts (300 ppm), respectively, based on the water content, of potassium iodide was added to the aqueous phase prior to polymerization of the reaction mixture. Table 1 summarizes the results obtained.

TABLE 1

| Concentration of Lauroyl Peroxide wt. % | Concentration of KI (ppm) | Gas Chromotography 7-Hour Monomer wt. % | Appearance Of Aqueous Phase |
|---|---|---|---|
| 8 | 50 | 3.54 | Cloudy |
| 8 | 100 | 2.84 | Slightly Cloudy |
| 8 | 200 | 2.68 | Slightly hazy |
| 8 | 300 | 3.54 | Clear |

It can be seen from Table 1 that the cloudiness of the aqueous phase disappears completely as the concentration of the potassium iodide increases from 50 to 300 ppm. The cloudiness of the aqueous phase indicates the presence of polymer in the aqueous phase and increases as the amount of polymer present in the aqueous phase also increases. Conversely, as the amount of polymer decreases in the aqueous phase, the aqueous phase becomes less cloudy until no polymer is present at which time the aqueous phase is clear. With the above-indicated conditions, the aqueous phase is clear when polymerization is effected in the presence of about 300 parts per million of potassium iodide. In addition, the monomer remaining after about 7 hours of polymerization time remains constant within the variations expected from the procedure over the range of potassium iodide concentrations employed.

The amount of polymerized particles recovered was found to be increased and to be about 95% by weight of the starting materials for the product made when using about 300 ppm II in the aqueous phase.

EXAMPLES VII-IX

Three toner compositions were prepared by dispersion polymerization as follows. An aqueous phase was prepared by dissolving about 0.5 parts of polyvinyl alcohol (Monsanto 20–60, St. Louis, Missouri) in about 500 parts of distilled water at about 75° C. using a magnetic stirrer equipped hot plate. About 0.2 parts of carbon black commercially available as Raven 420 from the Columbian Division of Cities Service Company, Akron, Ohio, was dispersed in the aqueous phase with agitation. To different portions of the aqueous phase was added about 0.25 parts (500 ppm), 0.5 parts (1000 ppm), and 0.75 parts (1500 ppm), respectively, based on the water content, of the transition metal salt ferrous sulfate.

The organic phase was prepared by dissolving about 51.6 parts of styrene and about 34.4 parts of n-butyl methacrylate in a 32 ounce wide-mouth polyethylene bottle. To the contents thereof was added about 14 parts of grafted carbon black. The grafted carbon black consisted of about 7 parts of carbon black and about 7 parts of styrene/n-butyl methacrylate (95/5) prepared by the method described in Example II. To this mixture was added about 1.72 parts of azo valeryonitrile with mixing to dissolve the contents of the bottle.

The organic phase was added to the aqueous phase and the mixture was sheared at a speed of about 7600 r.p.m. to disperse and suspend the droplets until their volume median size was about 10 microns. The dispersed suspension was then transferred to a one liter three-neck round bottom flask fitted with a Heller ® stirring motor and controller with a Teflon ® paddle blade stirrer for polymerization of the monomer dispersion. Two of the flask necks were closed with glass stoppers. The flask was placed in a water bath preheated to about 65° C. and the contents stirred at between about 100 to 200 r.p.m. for about 6 hours. The reaction mixture was then poured into about 3 liters of distilled water and stirred for about 2 hours. The polymerized particles were then allowed to settle, centrifuged, filtered, washed with water, and dried under vacuum at about 35° C. Table 2 summarizes the results obtained.

TABLE 2

| Concentration of $FeSO_4$ (ppm) | Appearance of Aqueous Phase |
|---|---|
| 500 | Slightly cloudy |
| 1000 | Slightly hazy |
| 1500 | Almost clear |

The amount of polyvinyl particles recovered was found to be increased and to be about 95% by weight of the starting materials for the product made when using about 1500 ppm Fe $SO_4$ in the aqueous phase.

Although specific materials and conditions were set forth in the above exemplary processes in making and using the toner particles of this invention, these are merely intended as illustrations of the present invention. Various other monomers, polymers, surfactants, initiators, suspending agents, colorants and reaction conditions such as those listed above may be substituted in the examples with similar results.

Other modifications of the present invention will occur to those skilled in the art upon a reading of the present disclosure. These are intended to be included within the scope of this invention.

What is claimed is:

1. An improved dispersion polymerization process for preparing colored toner particles which comprises admixing from about 2 to about 15 weight percent of an insoluble colorant, with a vinyl monomer so as to result in the formation of an oil soluble organic phase, agitating said organic phase, admixing from about 0.25 to about 3 percent by weight of an oil soluble polymerization initiator surfactant, followed by admixing said organic phase containing the polymerization initiator with an aqueous phase containing a suspending additive and less than 2,000 parts per million based on the weight of the aqueous phase of an alkali or alkaline earth metal halogen salt resulting in the formation of a suspension, polymerizing said suspension at a temperature of from about 30 degrees Centigrade to about 95 degrees Centigrade, thereby forming polymer particles containing said insoluble colorant and having a particle size in the range of from about 1 micron to about 100 microns, and recovering the polymer particles.

2. A process in accordance with claim 1 wherein the alkali or alkaline earth metal is selected from the group consisting of sodium, potassium, cadmium, magnesium, calcium, barium, or zinc, and the halogen is selected from chloride, iodide, or bromide.

3. A process in accordance with claim 1 wherein the alkali earth metal salt is potassium chloride.

4. A process in accordance with claim 1 wherein the alkali metal halogen salt is potassium iodide.

* * * * *